(12) United States Patent
Matsuoka et al.

(10) Patent No.: US 6,341,929 B1
(45) Date of Patent: Jan. 29, 2002

(54) COVER APPARATUS OF MACHINE TOOL

(75) Inventors: Nobuyuki Matsuoka, Ichinomiya; Masahiko Inukai, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/540,876

(22) Filed: Mar. 31, 2000

(30) Foreign Application Priority Data

Sep. 30, 1999 (JP) .............................. 11-279540

(51) Int. Cl.$^7$ ................................. B23Q 7/02
(52) U.S. Cl. .............. 414/226.05; 198/346.1; 483/14; 409/134
(58) Field of Search .................. 198/346.1, 465.1; 414/222.07, 226.05; 483/14; 404/134

(56) References Cited

U.S. PATENT DOCUMENTS

| | | | | |
|---|---|---|---|---|
| 4,797,052 A | * | 1/1989 | Ohta et al. ............... 414/744.3 |
| 5,265,497 A | * | 11/1993 | Curless .................... 198/346.1 |
| 5,531,004 A | * | 7/1996 | Ahn ........................... 409/134 |
| 5,971,679 A | * | 10/1999 | Kim ........................... 409/134 |

* cited by examiner

Primary Examiner—Christopher P. Ellis
Assistant Examiner—Mark A. Deuble
(74) Attorney, Agent, or Firm—Oliff & Berridge, PLC

(57) ABSTRACT

In a cover apparatus of a machine tool, a slide cover and turning covers are connected to a motor via an up-down movement mechanism and a cam drive portion. During operation of the motor, the slide cover and the turning covers are raised from a lowermost position to an uppermost position, and are held at the uppermost position, and then are lowered from the uppermost position to the lowermost position. The turning covers are connected to the motor also via a pivoting mechanism and an intermittent drive unit. During operation of the motor, the turning covers are turned while being held at the uppermost position. The apparatus thus prevents deviations of the up-down movement timing of the slide cover 47 and the up-down movement timing of the turning covers, thereby improving reliability.

23 Claims, 9 Drawing Sheets

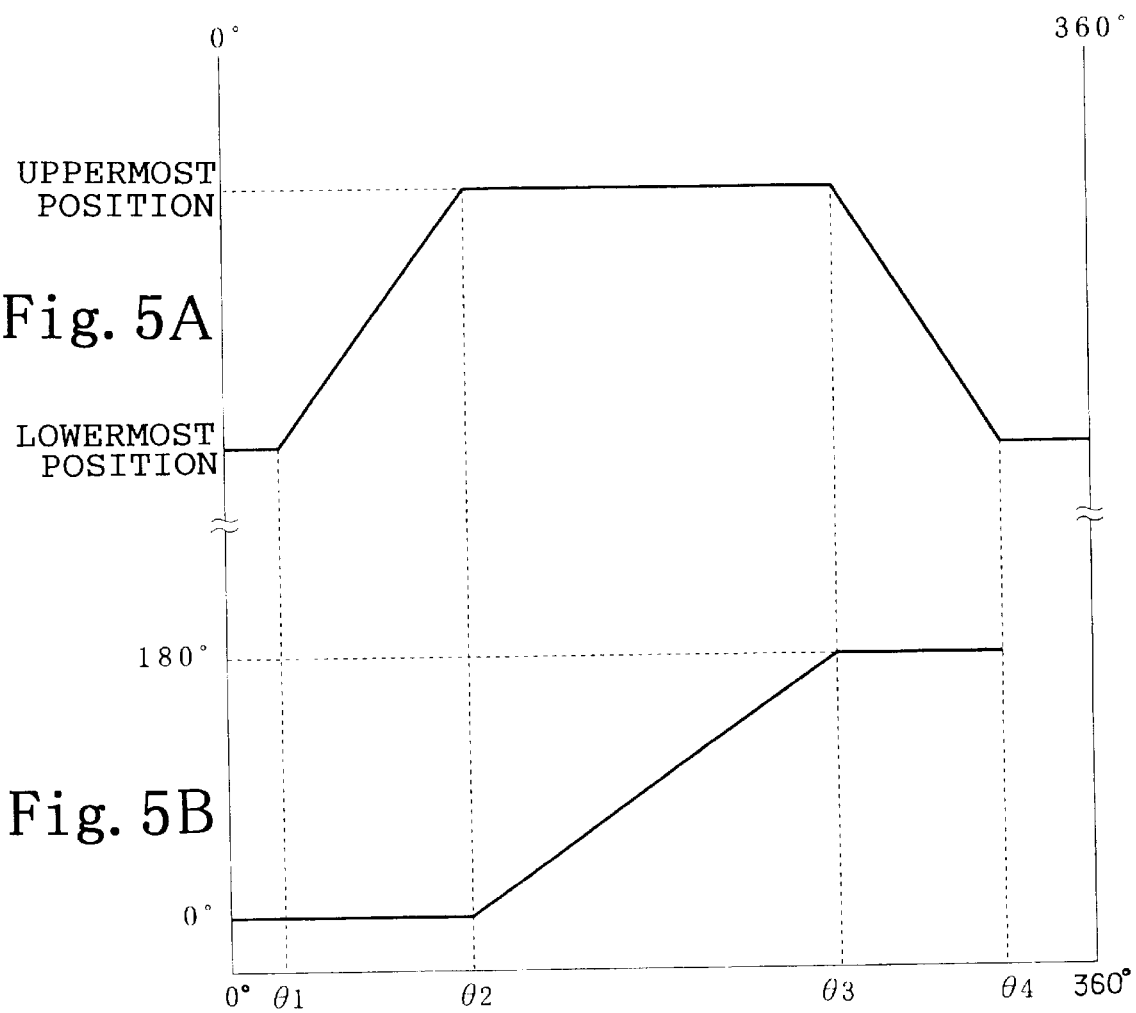

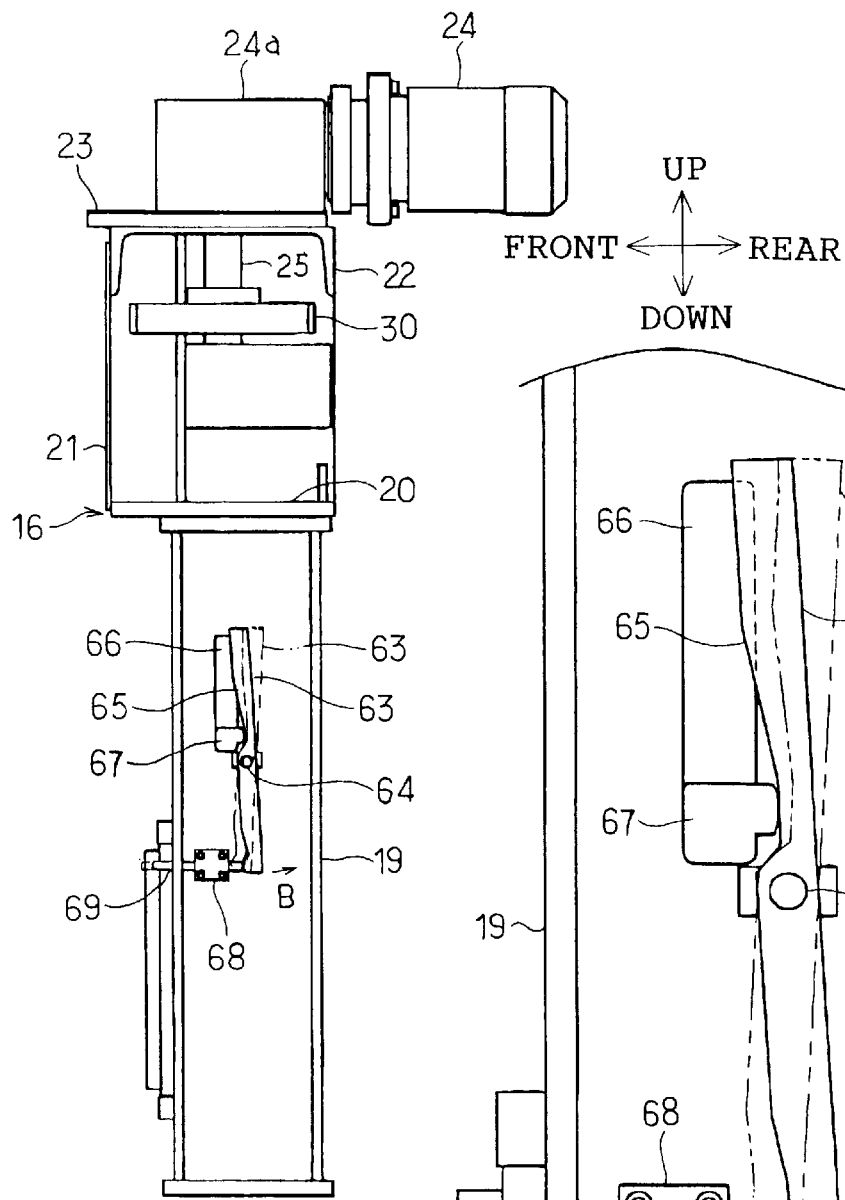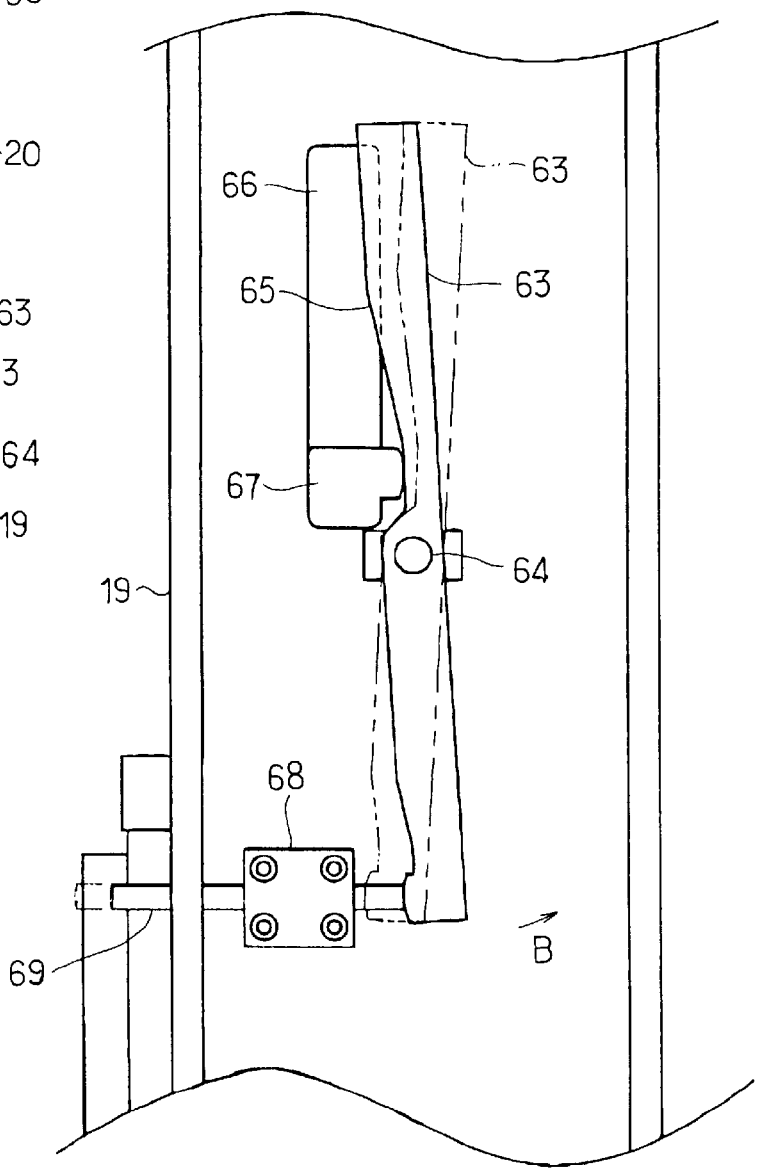

COVER APPARATUS OF MACHINE TOOL

BACKGROUND OF THE INVENTION

1. Field of the Invention

The present invention relates to a cover apparatus of a machine tool that separates a processing space, in which a workpiece is processed, and a setup space, in which setup for the processing is performed, from each other.

2. Description of the Related Art

A known machining center includes a first cover and a second cover that are arranged in a vertical positional relationship, between a processing space and a setup space. In this structure, the two spaces are partitioned during the processing of a workpiece by holding the first and second covers in a lowered state. To interchange the workpieces between the two spaces, for example, the first and second covers are held in a raised state.

In the above-described structure, the first and second covers are connected to different drive sources via different up-down movement mechanisms. Therefore, it is necessary to determine the time to drive each of the two drive force sources based on output signals from sensors. Hence, the possibility of a malfunction increases, and reliability decreases.

SUMMARY OF THE INVENTION

Accordingly, it is an object of the present invention to provide a cover apparatus of a machine tool that achieves high reliability.

In accordance with the present invention, a cover apparatus of a machine tool includes a first cover provided between a processing space, in which a workpiece is processed, and a setup space, in which a setup for a processing of the workpiece is performed, a second cover that is provided below the first cover, and that separates the processing space and the setup space from each other in cooperation with the first cover, an up-down movement mechanism that moves the first cover and the second cover upward and downward, a pivoting mechanism that pivots the second cover, and a drive force source that generates a drive force for the up-down movement mechanism and the pivoting mechanism.

In the above-described cover apparatus, the first cover and the second cover are connected to the single drive force source via the single up-down movement mechanism. Therefore, it becomes unnecessary to synchronize the drive times for a plurality of drive force sources based on output signals of sensors. Hence, the cover apparatus prevents deviations of the up-down movement timing of the first cover and the up-down movement timing of the second cover, thereby improving reliability.

The cover apparatus of a machine tool may further have a structure as described below. That is, the drive force source is formed by one drive portion, and the up-down movement mechanism and the pivoting mechanism are connected to the drive force source via a cam mechanism that transmits the drive force from the drive force source to the up-down movement mechanism and the pivoting mechanism at a set timing.

With this structure, the up-down movements of the first and second covers and the pivoting of the second cover are achieved by the single drive force source. Therefore, the need for a dedicated drive force source to pivot the second cover is eliminated, thereby allowing simplification of the structure. Furthermore, it becomes unnecessary to synchronize the drive time of a drive force source to move the first and second covers up and down and the drive time of a drive force source to pivot the second cover with each other based on output signals of sensors. Hence, the cover apparatus prevents deviations of the up-down movement timing of the first and second covers and the pivoting timing of the second cover, thereby further improving reliability.

The cover apparatus of a machine tool may further have a structure as described below. That is, the cam mechanism includes a first cam drive portion that transmits the drive force from the drive force source to the up-down movement mechanism so that the first cover and the second cover are held in a raised state, and a second cam drive portion that transmits the drive force from the drive force source to the pivoting mechanism when the first cover and the second cover are held in the raised state. The pivoting mechanism is connected to a workpiece changing arm that changes workpieces between the processing space and the setup space by pivoting below the second cover when the first cover and the second cover are raised.

Therefore, when the second cover is pivoted while the first and second covers are in the raised state, the workpiece changing arm interchanges the workpiece in the setup space and the workpiece in the processing space by pivoting together with the second cover. Since the up-down movement timing of the first and second covers is set by the dedicated first cam drive portion, and the pivoting timing of the second cover and the workpiece changing arm is set by the dedicated second cam drive portion, the cover apparatus prevents deviations of the up-down movement timing of the first and second covers, the pivoting timing of the second cover, and the pivoting timing of the workpiece changing arm, thereby further improving reliability.

Still further, in the cover apparatus of the invention, the up-down movement mechanism may have a lever to operate the first cover and the second cover. The lever overlaps a lower end portion of the first cover and an upper end portion of the second cover with each other when the first cover and the second cover are in a lowered state, and the lever separates the first cover and the second cover from each other when the first cover and the second cover are in the raised state.

Since the lower end portion of the first cover and the upper end portion of the second cover overlap each other when the first and second covers are in the lowered position, the cover apparatus prevents processing debris and the like from traveling from the processing space into the setup space via a gap between the first and second covers. Furthermore, since the overlap of the lower end portion of the first cover and the upper end portion of the second cover is discontinued when the first and second covers are in the raised state, the cover apparatus prevents the first cover from interfering with the second cover when the second cover is pivoted while the first and second cover are in the raised state.

BRIEF DESCRIPTION OF THE DRAWINGS

A preferred embodiment of the present invention will be described in detail with reference to the following figures wherein:

FIG. 5(a) is a chart indicating the behavior of a lever;

FIG. 5(b) is a chart indicating the behavior of the pallet changing arm and turning covers;

FIG. 6(a) is a side view of the protection cover apparatus;

FIG. 6(b) is an enlarged side view of portions of the apparatus shown in FIG. 6(a);

DETAILED DESCRIPTION OF PREFERRED EMBODIMENT

Figure 9:
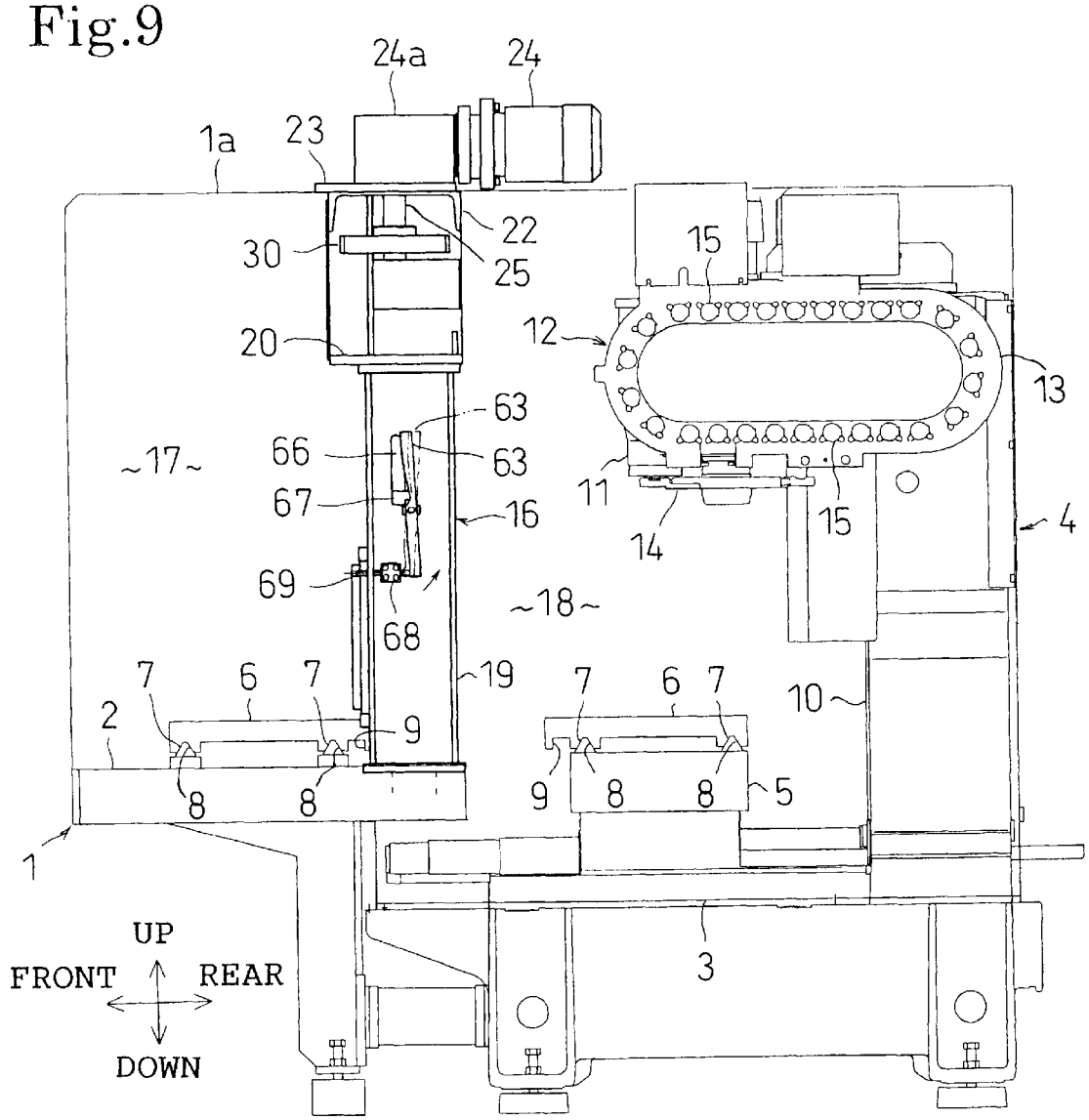
FIG. 9 is a side view showing an overall structure of the apparatus.

A preferred embodiment of the present invention will be described in detail hereinafter with reference to the accompanying drawings. Referring to FIG. 9, a table 1, placed on a surface, such as a floor in a factory, is covered with a splash cover 1a. The table 1 has a higher table portion 2 and a lower table portion 3 that are provided forward and rearward, respectively, in the table 1. A machining center 4 is mounted on the rearward lower table portion 3. The machining center 4, that is, a machine tool, is constructed as described below.

Machining Center 4

A work table 5 is mounted on an upper surface of the lower table portion 3 in such a manner that the work table 5 is movable rightward, leftward, forward, and rearward. A pallet 6 is placed on an upper surface of the work table 5. A workpiece (not shown) is placed on an upper surface of the pallet 6. The work table 5 has a plurality of triangular-shaped positioning protrusions 7. The pallet 6 has a plurality of triangular-shaped positioning recesses 8 and a plurality of rectangular-shaped positioning recesses 9 (only one of them is shown in FIG. 9). The pallet 6 is positioned at a processing position at which the workpiece on the pallet 6 is processed, by the positioning recesses 8 of the pallet 6 engaging with the protrusions 7 of the work table 5. During processing of the workpiece, the work table 5 and the pallet 6 are firmly secured by a pallet clamp device (not shown).

A column 10 is fixed to the upper surface of the lower table portion 3. A main shaft head 11 is attached to the column 10 so as to be movable up and down. A main shaft (not shown) extending in a vertical direction is rotatably connected to the main shaft head 11. A tool is detachably attached to a lower end portion of the main shaft. The main shaft is rotated and controlled based on an NC program. The tool attached to the main shaft is rotated together with the main shaft so as to process the workpiece on the pallet 6.

The work table 5 is moved rightward, leftward, forward or rearward by an amount of movement instructed by the NC program. At a set position that is defined by moving the work table 5, the tool of the main shaft processes the workpiece on the pallet 6. The main shaft head 11 is moved upward or downward by an amount instructed by the NC program. At a set depth that is defined by moving the main shaft head 11, the tool of the main shaft processes the workpiece on the pallet 6.

The machining center 4 has an automatic tool changer 12. The automatic tool changer 12 has a tool magazine 13 that is connected to a side face of the main shaft head 11, and a tool changing arm 14 that is rotatably connected to the main shaft head 11. The tool magazine 13 accommodates a plurality of tools 15. The tool changing arm 14 automatically extracts a predetermined tool 15 designated by the NC program from the tool magazine 13, and automatically replaces a tool attached to the main shaft with the predetermined tool. The machining center 4 is constructed in this manner.

A protection cover apparatus 16, corresponding to a cover apparatus, is mounted on the higher table portion 2 of the table 1. The protection cover apparatus 16 separates a setup space 17 over the higher table portion 2 from a processing space 18 over the lower table portion 3. The protection cover apparatus 16 is constructed as described below.

Protection Cover Apparatus 16

Figure 1:
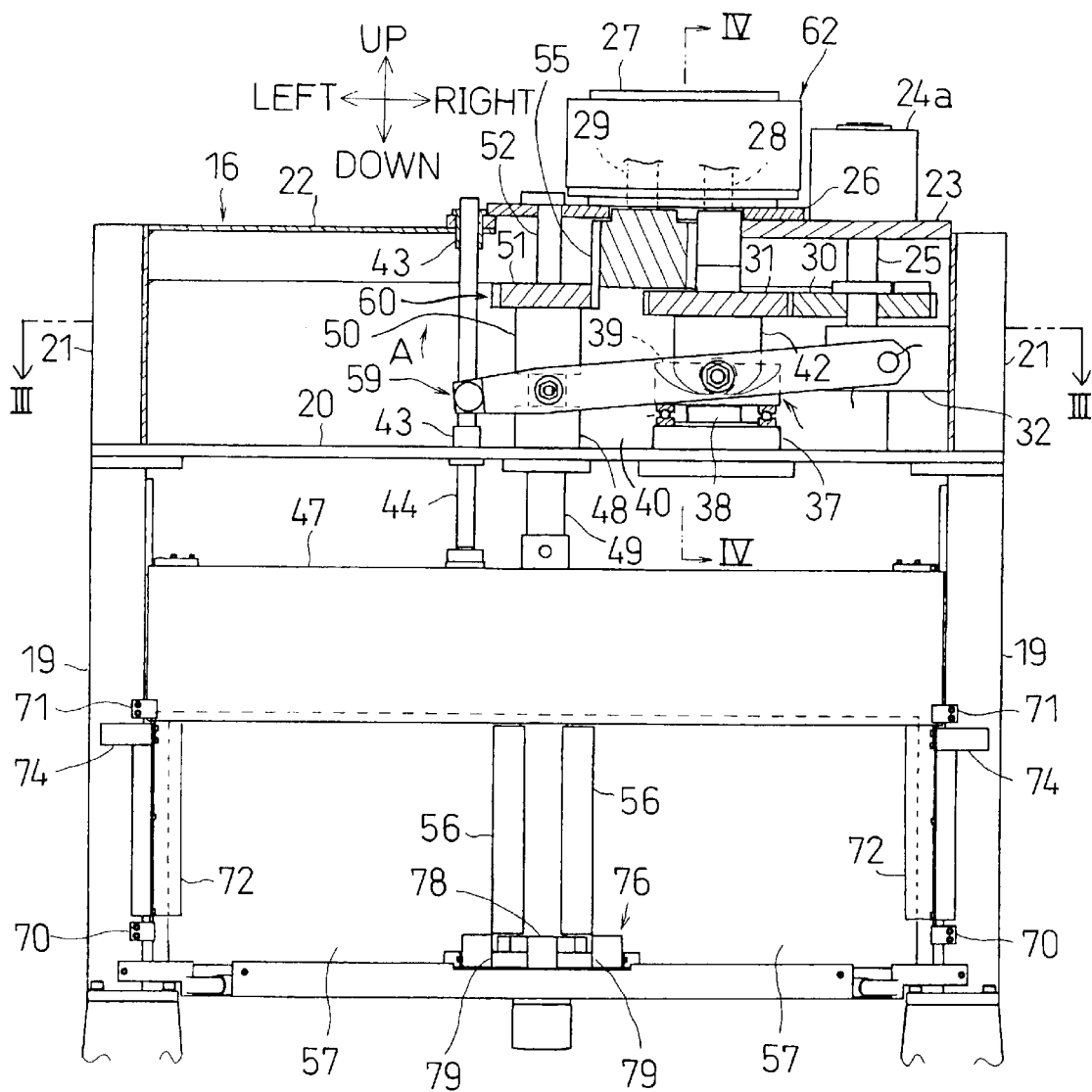
FIG. 1 is a front view of an embodiment of the invention that shows a protection cover apparatus and a pallet changer apparatus, with a pallet changing arm and the like being at a lowered position.
Figure 7:
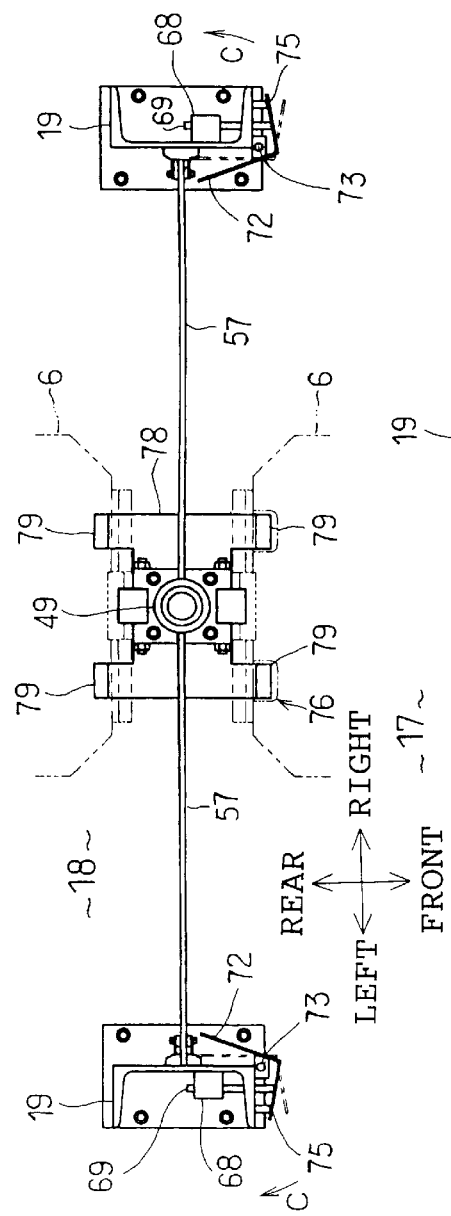
FIG. 7(a) is a top plan view showing the protection cover apparatus and the pallet changer apparatus.
FIG. 7(b) is an enlarged top plan view of portions of the apparatus shown in FIG. 7(a)
Figure 7:
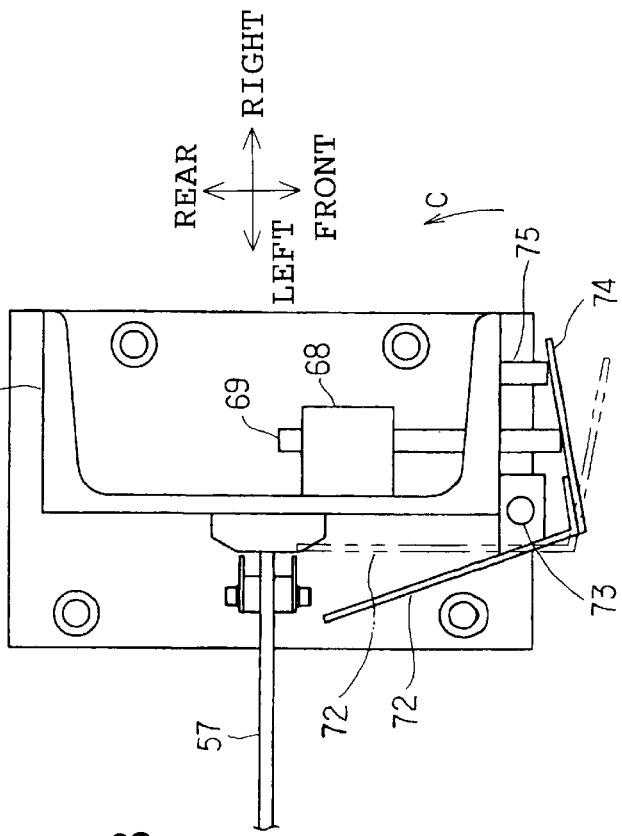

Referring to FIG. 7(a), laid-down square U-shaped support columns 19 are fixed to right and left side portions of the higher table portion 2. An intermediate plate 20 is fixed to upper end portions of the support columns 19 as shown in FIG. 1. Support columns 21 are fixed to right and left side portions of the intermediate plate 20. A top plate 22 is fixed to upper end portions of the support columns 21.

A mounting plate 23 is fixed to a right side portion of an upper surface of the top plate 22. As shown in FIG. 6(a), a speed reducing mechanism 24a of a motor 24 is fixed to the mounting plate 23. The motor 24 corresponds to a drive force source and a drive portion. A rotation shaft 25 of the motor 24 extends through the mounting plate 23 and protrudes downward from the mounting plate 23 as shown in FIG. 1. A mounting plate 26 is fixed to a left side portion of an upper surface of the mounting plate 23. An intermittent drive unit 27, corresponding to a second cam drive portion, is fixed to the mounting plate 26. The intermittent drive unit 27 has an input shaft 28 and an output shaft 29 that are rotatable. The input shaft 28 and the output shaft 29 of the intermittent drive unit 27 extend through the mounting plate 26 and protrude downward from the mounting plate 26.

A driving gear 30 is fixed to a lower end portion of the rotation shaft 25 of the motor 24. A driven gear 31 is fixed to a lower end portion of the input shaft 28 of the intermittent drive unit 27. The driving gear 30 is meshed with the driven gear 31. The driving gear 30 and the driven gear 31 have equal outside diameters and equal numbers of teeth. Therefore, during operation of the motor 24, the input shaft 28 of the intermittent drive unit 27 rotates at the same speed as the rotation shaft 25 of the motor 24.

Figure 3:
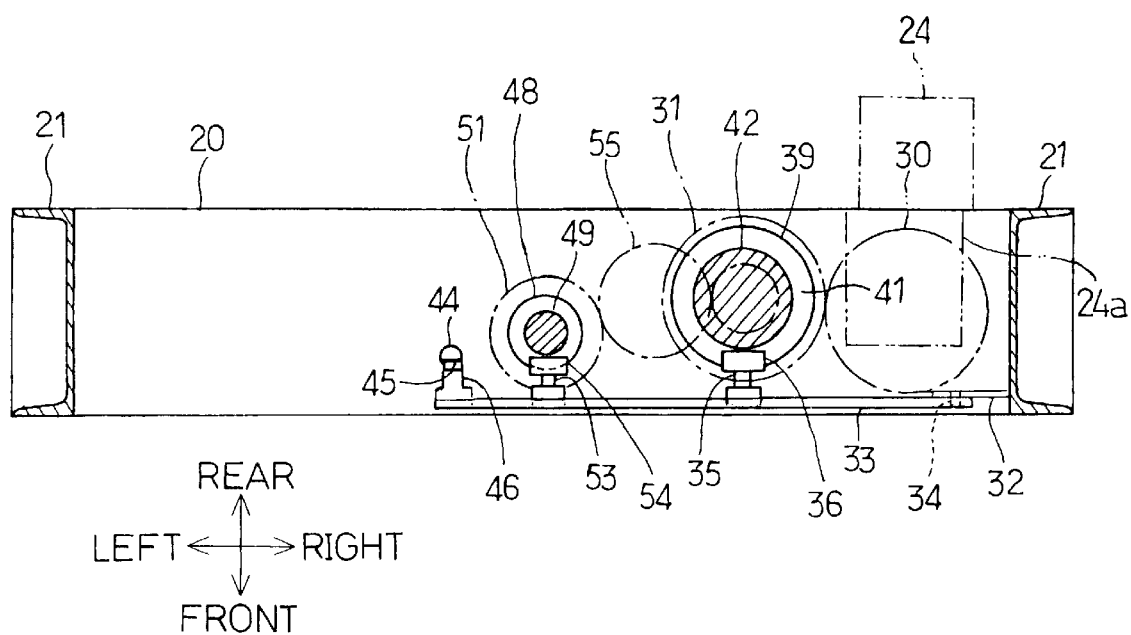
FIG. 3 is a sectional view taken along plane X3—X3 of FIG. 1.

A lever bracket 32 is fixed to the right-side support column 21. A lever 33 is connected at its right side end portion to the lever bracket 32 so that the lever 33 is pivotable about a shaft 34. As shown in FIG. 3, a shaft 35 is fixed to a portion of the lever 33 that is substantially central with respect to the length of the lever 33. The shaft 35 protrudes rearward from the lever 33. A circular cam follower 36 is rotatably connected to a rear end portion of the shaft 35.

Figure 4:
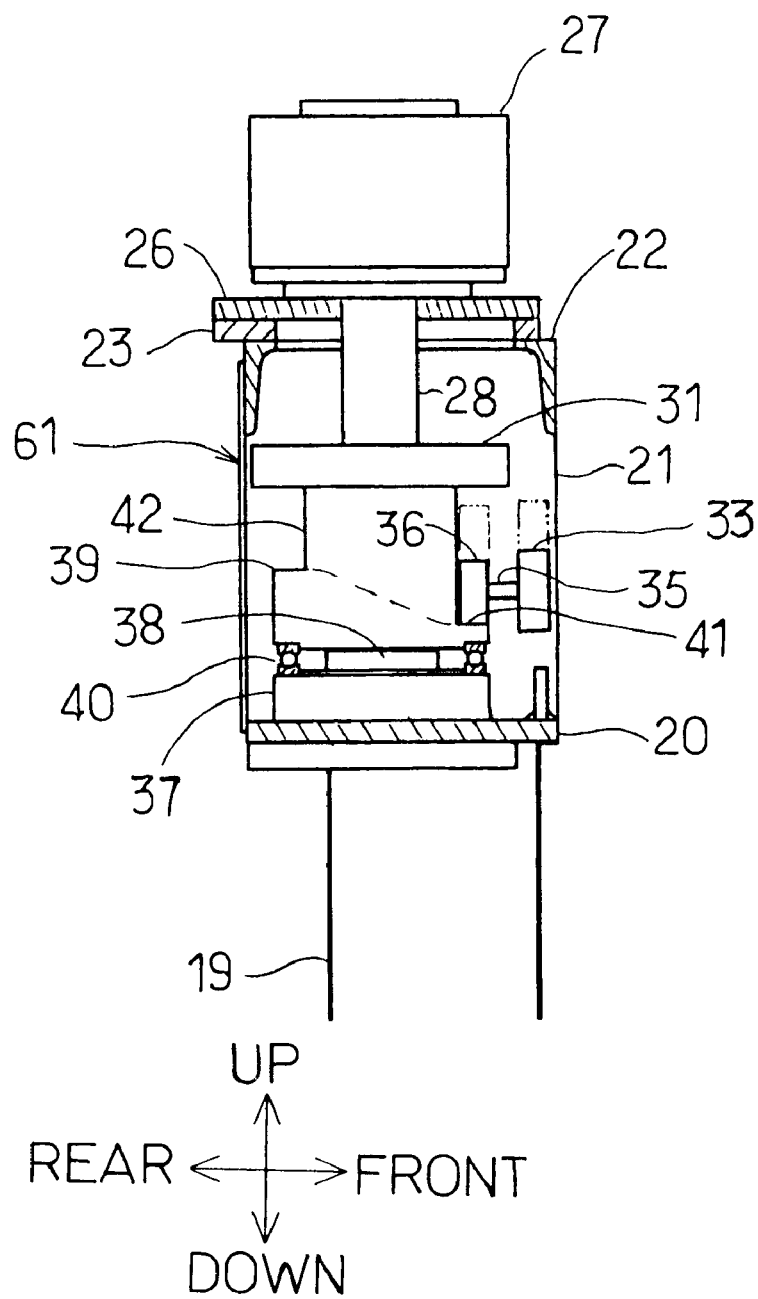
FIG. 4 is a sectional view taken along plane X4—X4 of FIG. 1.

A cam bracket 37 is disposed below the intermittent drive unit 27, and is fixed to the intermediate plate 20 as shown in FIG. 1. A cam 39 is rotatably connected to the cam bracket 37 by a shaft 38 as shown in FIG. 4. A thrust bearing 40 is disposed between the cam 39 and the cam bracket 37. The cam 39 has a cam surface 41 that is formed in an upper outer peripheral portion of the cam 39. The cam follower 36 of the lever 33 is held on the cam surface 41 by the weight of the lever 33 and the like.

A cylindrical connecting portion 42 is formed in a central portion of the cam 39. The connecting portion 42 is connected at its upper surface to the driven gear 31 of the intermittent drive unit 27. During operation of the motor 24, the cam 39 rotates together with the input shaft 28 of the intermittent drive unit 27. As the cam 39 rotates, the cam follower 36 of the lever 33 moves along the cam surface 41 of the cam 39, thereby pivoting the lever 33 about the shaft 34.

FIG. 5(a) is a chart indicating the relationship between the rotation phase angle of the motor 24 and the behavior of the lever 33. As indicated in FIG. 5(a), the lever 33 is held at a lowermost position at which the lever 33 is in a rightwardly upward sloped posture (see FIG. 1) in the range of rotation phase angle of 0°–θ1°. In the range of rotation phase angle of θ1°–θ2°, a left side portion of the lever 33 turns in a direction indicated by an arrow A in FIG. 1. In the range of rotation phase angle of θ2°–θ3°, the lever 33 is held at an uppermost position at which the lever 33 is in a leftwardly upward sloped posture (see FIG. 2). In the range of rotation phase angle of θ3°–θ4°, the left side portion of the lever 33 turns in the direction opposite to the direction of an arrow in FIG. 2. In the range of rotation phase angle of θ4°–360°, the lever 33 is held at the lowermost position as in FIG. 1.

As shown in FIG. 1, sleeves 43 are fixed to the top plate 22 and the intermediate plate 20, respectively, at a position that is shifted sideways to the left from a central portion of the plate in the right-to-left direction. A cylindrical slide rod 44 is inserted through the sleeves 43 for upward and downward movements. As shown in FIG. 3, the slide rod 44 has an engaging portion 45 that has a cutout shape and that opens forward.

A pin 46 is fixed to a left end portion of the lever 33. The pin 46 is engaged with the engaging portion 45 of the slide rod 44 in a manner that allows the pin 46 to shift in position. Therefore, during operation of the motor 24, the slide rod 44 is moved upward by the lever 33 pivoting in the direction of the arrow A in FIG. 1, and then is moved downward by the lever 33 pivoting in the direction opposite to the direction of the arrow in FIG. 2.

As shown in FIG. 1, a platy slide cover 47, corresponding to a first cover, is disposed between the support columns 19 slidably upward and downward. The slide cover 47 is connected to a lower end portion of the slide rod 44 in a manner that prevents rotational movements. During operation of the motor 24, the slide cover 47 is moved upward by the lever 33 pivoting in the direction of the arrow A in FIG. 1, and then is moved downward by the lever 33 pivoting in the direction opposite to the direction of the arrow in FIG. 2.

As shown in FIG. 1, a sleeve 48 is fixed to the intermediate plate 20, at the right side of the slide rod 44. A turning rod 49 is inserted through the sleeve 48 in such a manner that the turning rod 49 is movable upward and downward and rotatable. The turning rod 49 has a large-diameter portion 50 in an upper end portion of the turning rod 49. A turning gear 51 is fixed to an upper end portion of the large-diameter portion 50. A core shaft 52 is fixed to the mounting plate 26, at the left side of the intermittent drive unit 27. The turning gear 51 is fitted over an outer peripheral surface of the core shaft 52 so that the turning gear 51 is movable upward and downward and rotatable.

As shown in FIG. 3, a shaft 53 is fixed to the lever 33, at the right side (base-end side) of the pin 46. The shaft 53 protrudes rearward from the lever 33. A roller 54 is rotatably connected to a rear end portion of the shaft 53. The roller 54 supports the large-diameter portion 50 of the turning rod 49 from below. During operation of the motor 24, the turning rod 49 and the turning gear 51 are moved upward by the lever 33 pivoting in the direction of the arrow A in FIG. 1, and then are moved downward by the lever 33 pivoting in the direction opposite to the direction of the arrow in FIG. 2.

The intermittent drive unit 27 is of a parallel cam type having two plate cams (not shown) and two rows of plural driven rollers (not shown). The input shaft 28 of the intermittent drive unit 27 is connected to the two plate cams, and the output shaft 29 is connected to the two rows of driven rollers. The two plate cams are rotatable together with the input shaft 28. The two rows of driven rollers are sequentially conveyed by the two plate cams. As the two rows of driven rollers are conveyed, the output shaft 29 is rotated. FIG. 5(b) is a graph indicating the relationship between the rotation phase angle of the motor 24 and the behavior of the output shaft 29. The output shaft 29 is turned 180° only in the range of rotation phase angle of θ2°–θ3°, where the lever 33 is held at the uppermost position.

As shown in FIG. 1, an output gear 55 is fixed to the output shaft 29 of the intermittent drive unit 27. The output gear 55 is meshed with the turning gear 51. The turning gear 51 and the output gear 55 have equal diameters and equal numbers of teeth. Therefore, in the range of rotation phase angle of θ2°–θ3°, where the slide cover 47 is held at the uppermost position, the turning gear 51 and the turning rod 49 are turned 180 in concert with the output shaft 29.

In the range of rotation phase angle of θ1°–θ2°, where the slide cover 47 is moved upward from the lowermost position to the uppermost position, the output shaft 29 is held in a still state, but the turning gear 51 and the turning rod 49 are moved upward in concert with the lever 33. In the range of rotation phase angle of θ3°–θ4°, where the slide cover 47 is moved downward from the uppermost position to the lowermost position, the output shaft 29 is held in the still state, but the turning gear 51 and the turning rod 49 are moved downward in concert with the lever 33.

As shown in FIG. 1, two brackets 56 are fixed to a lower end portion of the turning rod 49. The brackets 56 are spaced apart from each other by 180° in a circumferential direction. Platy turning covers 57, corresponding to a second cover, are connected to the brackets 56, respectively. In the ranges of rotation phase angle of 0°–θ1° and θ4°–360°, where the slide cover 47 is held at the lowermost position, the turning covers 57, corresponding to a partition cover, are pivoted to a closed state in which the turning covers 57 cover the machining center 4 from a forward side, and upper end portions of the turning covers 57 overlap a lower end portion of the slide cover 47 in the front-to-rear direction.

Figure 2:
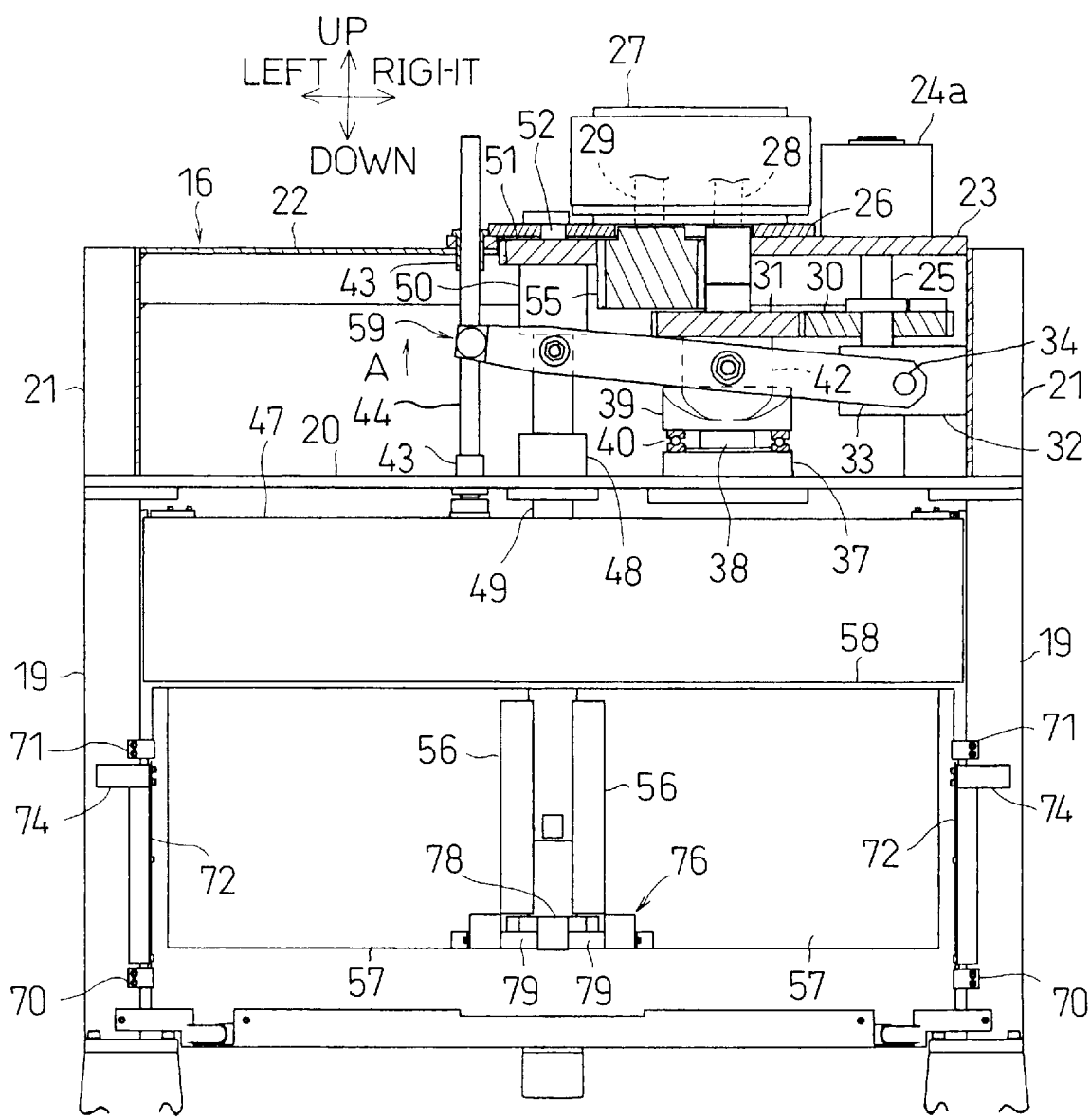
FIG. 2 is a front view of the protection cover apparatus and the pallet changer apparatus, with the pallet changing arm and the like being at an elevated position.

In the range of rotation phase angle of θ1°–θ2°, where the slide cover 47 is moved upward from the lowermost position to the uppermost position, the large-diameter portion 50 of the turning rod 49 is pushed upward by the roller 54 of the lever 33 and, therefore, the turning covers 57 are elevated together with the turning rod 49 while the closed state of the turning covers 57 is maintained. Since the slide rod 44 is connected to a distal end portion of the lever 33, whereas the turning rod 49 is connected to a relatively base end side of the lever 33, the amount of elevation of the slide cover 47 becomes greater than that of the turning covers 57, so that a clearance 58 is formed between the lower end of the slide cover 47 and the upper ends of the turning covers 57 as can be seen in FIG. 2.

In the range of rotation phase angle of θ2°–θ3°, where the slide cover 47 is held at the uppermost position, the turning covers 57 are pivoted 180 by the output shaft 29 of the intermittent drive unit 27 while the turning covers 57 are held at the uppermost position. Since the clearance 58 exists between the lower end of the slide cover 47 and the upper ends of the turning covers 57, the slide cover 47 does not interfere with the pivoting movements of the turning covers 57.

In the range of rotation phase angle of θ3°–θ4°, where the slide cover 47 is moved downward from the uppermost position to the lowermost position, the roller 54 of the lever 33 moves downward. Therefore, a point at which the roller 54 supports the turning rod 49 gradually descends, so that the turning covers 57 return to the lowermost position together with the turning rod 49, while the closed state of the turning covers 57 is maintained as shown in FIG. 1.

In FIG. 1, reference numeral 59 represents an up-down movement mechanism that is mainly formed by the lever 33, the slide rod 44, the pin 46 of the lever 33, the turning rod 49, and the roller 54 of the lever 33. As is apparent from the above description, the up-down movement mechanism 59 moves the slide cover 47 and the turning covers 57 upward and downward. Reference numeral 60 in FIG. 1 represents a pivoting mechanism that is mainly formed by the turning rod 49, the turning gear 51, and the output gear 55. The pivoting mechanism 60 pivots the turning covers 57, as is apparent from the above description.

Reference numeral 61 in FIG. 4 represents a first cam drive portion that is mainly formed by the driving gear 30, the driven gear 31, the cam follower 36 of the lever 33, and the cam 39. The first cam portion 61 transmits drive force from the motor 24 to the up-down movement mechanism 59 so as to hold the slide cover 47 and the turning covers 57 at the uppermost position, as is apparent from the above description. Reference numeral 62 in FIG. 1 represents a cam mechanism (drive force transmitting mechanism) that is mainly formed by the first cam portion 61, and the intermittent drive unit 27 corresponding to the second cam drive portion. The cam mechanism 62 transmits drive force from the motor 24 to the up-down movement mechanism 59 and the pivoting mechanism 60 at set timings, as is apparent from the above description.

As shown in FIGS. 6(a) and 6(b), each support column 19 is provided with a vertically elongated lever 63 that is connected thereto rotatably about a shaft 64. Each lever 63 has a centrally receded cam surface 65. Each support column 19 has a vertically elongated hole forward of the lever 63.

Cams 67 are fixed to both sides of the slide cover 47. Each cam 67 is slidably inserted in the elongated hole 66 of the corresponding support column 19. While the slide cover 47 is held at the lowermost position, each cam 67 is held in contact with a lower portion of the cam surface 65 of the corresponding lever 63 in such a manner that the lever 63 is held at a position where a lower end portion of the lever 63 is turned in a direction of an arrow B as indicated by a solid line in FIG. 6(b). When the slide cover 47 is moved to the uppermost position, each cam 67 is moved to an upper portion of the corresponding cam surface 65 so that a lower end portion of the lever 63 is turned in the direction opposite to the direction of the arrow B as indicated by the double dashed chain line in FIG. 6(b).

Each support column 19 is proviced with a bracket 68 that is fixed thereto so as to face a lower end portion of the lever 63. Each bracket 68 is provided with a push rod 69 that is connected thereto slidably forward and rearward. Each push rod 69 is held at a withdrawn position as indicated by a solid line in FIG. 6(b) when the slide cover 47 is held at the lowermost position. When the slide cover 47 is moved to the uppermost position, each push rod 69 is pushed forward by the lower end portion of the corresponding lever 63 as indicated by a double dashed chain line in FIG. 6(b).

As shown in FIG. 1, each support column 19 is provided with a bracket 70 and a bracket 71 that are fixed to a lower end portion of the support column 19 and to a central portion with respect to the height of the support column 19, respectively. As shown in FIGS. 7(a) and 7(b), a shaft 73 of a sub-cover 72 is rotatably connected to each pair of brackets 70, 71. Each sub-cover 72 has an L-shaped sectional shape, having vertically elongated front and side platy portions. Each sub-cover 72 is provided with a push plate 74 that is fixed to an upper end portion of the front platy portion of the sub-cover 72 as shown in FIG. 1. Each support column 19 is provided with a pin 75 that faces the corresponding push plate 74 as shown in FIGS. 7(a) and 7(b).

A cover spring (not shown) is disposed between each sub-cover 72 and the corresponding support column 19. Each cover spring urges the corresponding sub-cover 72 in a direction indicated by an arrow C in FIGS. 7(a) and 7(b) When the slide cover 47 and the turning covers 57 are held at the lowermost position, each sub-cover 72 are held in contact with the pin 75 and the push rod 69 by force from the cover spring as indcted by a solid line in FIG. 7(b). In this state, each sub-cover 72 overlaps the corresponding turning cover 57 in the front-to-rear direction, thus covering the turning covers 57 and the support columns 19 from the front side.

When the slide cover 47 and the turning covers 57 are moved from the lowermost position to the uppermost position, each push rods 69 is pushed forward by the corresponding lever 63 as indicated by the double dasned chain line in FIG. 6(b), so that each push rod 69 pushes the corresponding push plate 74 forward. Tierefore, each sub-cover 72 is pivoted in the direction opposite to the direction of the arrow C as indicated by the double dashed chain line in FIG. 7(b). In this state, each sub-cover 72 is withdrawn toward a side end of the corresponding turning cover 57, thus preventing the turning covers 57 from interfering with the sub-covers 72 when the turning covers 57 are turned.

As the slide cover 47 and the turning covers 57 are moved from the uppermost position to the lowermost position, the cams 67 of the slide cover 47 descend. Since each sub-cover 72 is urged by the cover spring, each sub-cover 72 pushes the corresponding push rod 69 backward, so that each push rod 69 pushes the lower end portion of the corresponding lever 63 rearward. Thus, the levers 63 are pivoted in the direction of the arrow B in FIG. 6. Each sub-cover 72 pivots in the direction of the arrow C as the slide cover 47 and the turning covers 57 descend. When the slide cover 47 and the turning covers 57 reach the lowermost position, the sub-covers 72 return to the state indicated by the solid line in FIG. 7(b). The protection cover apparatus 16 is constructed in this manner.

Figure 8:
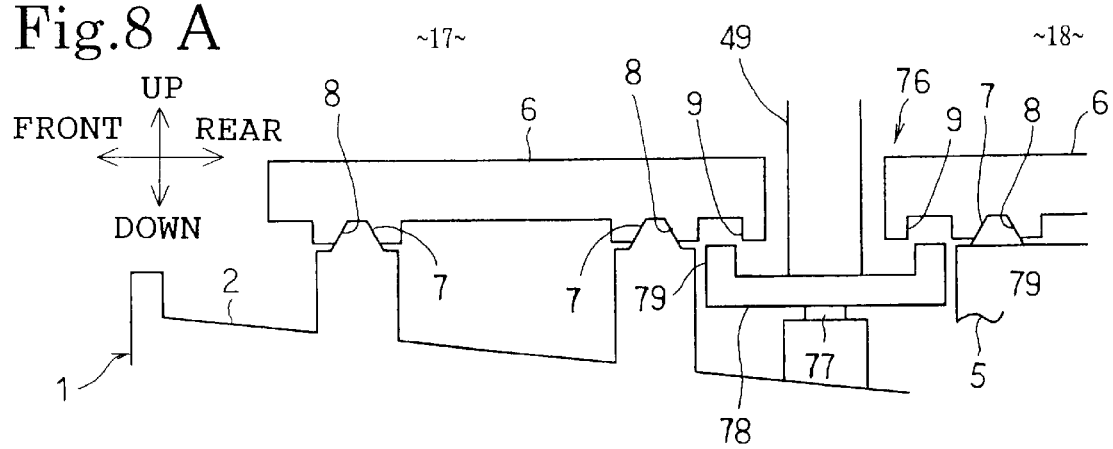
FIG. 8(a) is a side view showing the pallet changer apparatus, with the pallet changing arm being at the lowered position.
FIG. 8(b) is a side view showing the pallet changer apparatus, with the pallet changing arm raised.
Figure 8:
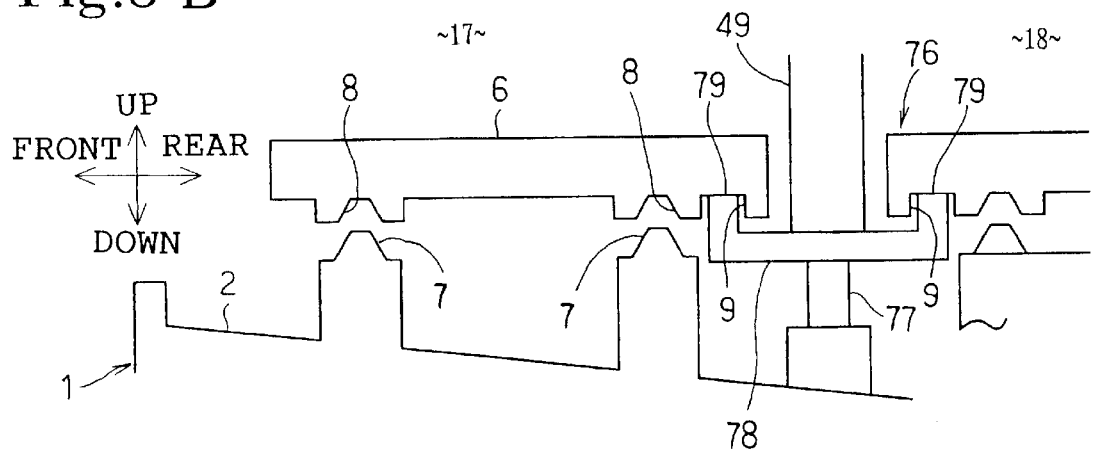

As shown in FIGS. 8(a) and 8(b), the table 1 is provided with a pallet changer apparatus 76. The pallet changer apparatus 76 shares the motor 24, the up-down movement mechanism 59, the pivoting mechanism 60, the intermittent drive unit 27, the first cam portion 61, and the cam mechanism 62, with the protection cover apparatus 16. The pallet changer apparatus 76 is constructed as described below.

Pallet Changer Apparatus 76

A shaft 77 is fixed to the higher table portion 2 of the table 1. A pallet changing arm 73, corresponding to a workpiece changing arm, is connected to the shaft 77 in such a manner that the pallet changing arm 78 is movable upward and downward and rotatable. Each of opposite end portions of the pallet changing arm 78 is provided with two upwardly protruded pallet holding portions 79 as shown in FIG. 7(a). The pallet changing arm 78 is connected to a lower end portion of the turning rod 49. When the turning covers 57 are in the closed state, the pallet changing arm 78 is directed in the front-to-rear direction.

As shown in FIG. 8(a), the positioning protrusions 7 are provided on the higher table portion 2 of the table 1. The positioning protrusions 7 of the higher table portion 2 are engaged with the positioning recesses 8 of a pallet 6. The pallet 6 on the higher table portion 2 carries thereon a workpiece (not shown). The pallet 6 on the higher table portion 2 is set at the setup position to perform setups by the positioning recesses 8 of the pallet 6 engaging with the positioning protrusions 7 of the higher table portion 2. The pallet changer apparatus 76 is constructed in this manner.

The operation performed by the above-described construction will be described. In the range of rotation phase angle of the motor 24 of 0°–θ1°, the slide cover 47 is held at its lowermost position, and the turning covers 57 are held at their lowermost position in the closed state. Furthermore, the sub-covers 72 overlap the turning covers 57 in the forward direction, thereby covering gaps between the turning covers 57 and the corresponding support columns 19 from the front side. In this state, the two pallet holding portions 79 on the rearward end portion of the pallet changing arm 78 are positioned below the engaging recesses 9 of the pallet 6 positioned at the processing position, and the two pallet holding portions 79 at the forward end portion of the pallet changing arm 78 are positioned below the engaging recesses 9 of the pallet 6 positioned at the setup position, as shown in FIG. 8(a).

In the range of rotation phase angle of the motor 24 of θ1°–θ2°, the slide cover 47 is raised from the lowermost position to the uppermost position, and the turning covers 57 are raised from the lowermost position to the uppermost position while remaining in the closed state. At the same time, each sub-cover 72 is pivoted in the direction opposite to the direction of the arrow C in FIG. 7(b) to withdraw out of the turning locus of the corresponding turning cover 57. At this moment, the pallet changing arm 78 is raised together with the turning covers 57, so that the rearward pallet holding portions 79 of the pallet changing arm 78 engage with the engaging recesses 9 of the pallet 6 positioned at the processing position, and the forward pallet holding portions 79 of the pallet changing arm 78 engage with the engaging recesses 9 of the pallet 6 positioned at the setup position. Then, the two pallets 6 are lifted by the pallet changing arm 78, so that the positioning recesses 8 of the pallets 6 disengage from the positioning protrusions 7 of the table 1.

In the range of rotation phase angle of the motor 24 of θ2°–θ3°, the turning covers 57 are turned 180 while being held at the uppermost position, and the pallet changing arm 78 is turned 180° together with the turning covers 57. Due to this movement, the pallet 6 positioned at the processing position is conveyed therefrom into the setup space 17, and the pallet 6 positioned at the setup position is conveyed therefrom into the processing space 18. The pallet 6 conveyed from the processing position is positioned so that the positioning recesses 8 of the pallet 6 face, from above, the positioning protrusions 7 in the setup space 17. The pallet 6 conveyed from the setup position is positioned s,o that the positioning recesses 8 of the pallet 6 face, from above, the positioning protrusions 7 in the processing space 18.

In the range of rotation phase angle of the motor 24 of θ3°–θ4°, the slide cover 47 is moved down from the uppermost position to the lowermost position, and the turning covers 57 are moved down from the uppermost position to the lowermost position while being held in the closed state. Due to this movement, each sub-cover 72 is pivoted in the direction indicated by the arrow C in FIG. 7(b) to return to the overlap position forward of the corresponding turning cover 57. Simultaneously, the pallet changing arm 78 is moved down together with the turning covers 57, so that the positioning recesses 8 of the pallet 6 in the setup space 17 engage with the positioning protrusions 7 of the table 1 in the setup space 17 and so that the positioning recesses 8 of the pallet 6 in the processing space 18 engage with the positioning protrusions 7 of the table 1 in the processing space 18. Thus, the pallet 6 at the processing position and the pallet 6 at the setup position are automatically exchanged in position.

In the foregoing embodiment, the slide cover 47 and the turning covers 57 are connected to the single motor 24 via the single up-down movement mechanism 59. Therefore, it becomes unnecessary to synchronize the drive times of a plurality of drive force sources based on output signals of sensors. Hence, the embodiment prevents deviations of the up-down movement timing of the slide cover 47 and the up-down movement timing of the turning covers 57, thereby improving reliability.

Furthermore, the up-down movement mechanism 59 and the pivoting mechanism 60 are connected to the motor 24 via the cam mechanism 62. Therefore, the need for a dedicated drive force source to pivot the turning covers 57 is eliminated, thereby allowing simplification of the structure. Further, it becomes unnecessary to synchronize the drive time of a drive force source to move the slide cover 47 and the turning covers 57 up and down, and the drive time of a drive force source to pivot the turning covers 57 with each other based on output signals of sensors. Hence, the embodiment prevents deviations of the up-down movement timing of the slide cover 47 and the turning covers 57, and the pivoting timing of the turning covers 57, thereby further improving reliability.

Still further, the up-down movement mechanism 59 and the pivoting mechanism 60 are connected to the motor 24 via the first cam portion 61 and the intermittent drive unit 27, and the pallet changing arm 78 is connected to the pivoting mechanism 60. Therefore, the up-down movement timing of the slide cover 47 and the turning covers 57 is set by the dedicated first cam drive portion 61, and the pivoting timing of the turning covers 57 and the pallet changing arm 78 is set by the dedicated intermittent drive unit 27. Hence, the embodiment prevents deviations of the up-down movement timing of the slide cover 47 and the turning covers 57, the pivoting timing of the turning covers 57, and the pivoting timing of the pallet changing arm 78, thereby further improving reliability.

Further, the lower end portion of the slide cover 47 overlaps the upper end portions of the turning covers 57 when the slide cover 47 and the turning covers 57 are in a lowered state. Therefore, the embodiment prevents an undesired event, such as processing debris and the like traveling from the processing space 18 into the setup space 17 via a gap between the slide cover 47 and the turning covers 57. Furthermore, the overlap of the lower end portion of the slide cover 47 and the upper end portions of the turning covers 57 is discontinued when the slide cover 47 and the turning covers 57 are in a raised state. Therefore, the embodiment prevents the turning covers 57 from interfering with the slide cover 47 when the turning covers 57 are pivoted.

Although in the foregoing embodiment, the up-down movements of the slide cover 47, the up-down movements of the turning covers 57, the pivoting of the turning cover 57, and the pivoting of the pallet changing arm 78 are accomplished by using the single motor 24, this arrangement is not restrictive. For example, it is possible to provide an arrangement in which the up-down movements of the slide cover 47 and the up-down movements of the turning covers 57 are accomplished by a first single drive force source, and the pivoting of the turning covers 57 and the pivoting of the pallet changing arm 78 are accomplished by a second single drive force source. In this case, it is preferable to drive the second drive force source when the clearance 58 exists between the slide cover 47 and the turning covers 57, so as to prevent the turning covers 57 from interfering with the slide cover 47 when the turning covers 57 are turned.

Although in the foregoing embodiment, the sub-covers 72 are provided between the turning covers 57 and the corresponding support columns 19, this arrangement is not restrictive. For example, the sub-covers 72 may be omitted.

Although in the foregoing embodiment, the pallet changing arm 78 is connected to the pivoting mechanism 60 and therefore is driven by the motor 24, this arrangement is not restrictive. For example, the pallet changing arm 78 may also be driven by a dedicated drive force source and a dedicated pivoting mechanism.

Furthermore, although in the foregoing embodiment, the up-down movement timing of the slide cover 47 and the turning covers 57 and the pivoting timing of the turning covers 57 are synchronized by the cam mechanism 62, this arrangement is not restrictive. Any arrangement is possible as long as the arrangement transmits drive force from the motor 24 to the pivoting mechanism 60, so that the turning covers 57 are pivoted, while the clearance 58 exists between the slide cover 47 and the turning covers 57.

As is apparent from the above description, the cover apparatus of a machine tool of the invention achieves advantages as discussed below.

Since the first cover and the second cover are connected to a single drive force source via a single up-down movement mechanism, the cover apparatus prevents deviations of the up-down movement timing of the first cover and the up-down movement timing of the second cover, thereby improving reliability.

With a structure in which drive force is transmitted from the drive force source to the up-down movement mechanism and the pivoting mechanism via a cam mechanism, the cover apparatus prevents deviations of the up-down movement timing of the first and second covers and the pivoting timing of the second cover, thereby further improving reliability.

With a structure in which the up-down movement timing of the first and second covers is set by a first cam drive portion, and the pivoting timing of the second cover and the workpiece changing arm is set by a second cam drive portion, the cover apparatus prevents deviations of the up-down movement timing of the first and second covers, the pivoting timing of the second cover, and the pivoting timing of the workpiece changing arm, thereby further improving reliability.

With a structure in which a lower end portion of the first cover overlaps an upper end portion of the second cover when the first and second covers are in a lowered state, the cover apparatus prevents an undesired event, such as processing debris and the like traveling from the processing space into the setup space. Furthermore, with a structure in which the overlap of the lower end portion of the first cover and the upper end portion of the second cover is discontinued when the first and second covers are in a raised state, the cover apparatus prevents the first cover from interfering with the second cover when the second cover is pivoted while the first and second cover are in the raised state.

It is to be understood that the invention is not restricted to the particular forms shown in the foregoing embodiment. Various modifications and alterations can be made thereto without departing from the scope of the invention.

What is claimed is:

1. A cover apparatus of a machine tool for use with a workpiece, wherein a processing space is defined in which the workpiece is processed, and a setup space is defined in which a setup for processing of the workpiece is performed, the apparatus comprising:

a first cover provided between the processing space and the setup space;

a second cover provided below the first cover, the second cover separating the processing space and the setup space from each other in cooperation with the first cover;

an up-down movement mechanism that moves the first cover and the second cover upward and downward; and a pivoting mechanism that pivots the second cover.

2. The cover apparatus according to claim 1, further including a drive force source that generates a drive force for the up-down movement mechanism and the pivoting mechanism.

3. The cover apparatus according to claim 2, wherein the drive force source is formed by one drive portion, and wherein the up-down movement mechanism and the pivoting mechanism are connected to the drive force source via a cam mechanism that transmits the drive force from the drive force source to the up-down movement mechanism and the pivoting mechanism at a set timing.

4. The cover apparatus according to claim 3, wherein the cam mechanism comprises a first cam drive portion that transmits the drive force from the drive force source to the up-down movement mechanism so that the first cover and the second cover are held in a raised state, and a second cam drive portion that transmits the drive force from the drive force source to the pivoting mechanism when the first cover and the second cover are held in the raised state, and wherein the pivoting mechanism is connected to a workpiece changing arm that moves the workpiece between the processing space and the setup space by pivoting below the second cover when the first cover and the second cover are raised.

5. The cover apparatus according to claim 4, wherein the up-down movement mechanism has a lever that operates the first cover and the second cover, and the lever overlaps a lower end portion of the first cover and an upper end portion of the second cover with each other when the first cover and the second cover are in a lowered state, and the lever separates the first cover and the second cover from each other when the first cover and the second cover are in the raised state.

6. The cover apparatus according to claim 3, wherein the up-down movement mechanism has a lever that operates the first cover and the second cover, and the lever overlaps a lower end portion of the first cover and an upper end portion of the second cover with each other when the first cover and the second cover are in a lowered state, and the lever separates the first cover and the second cover from each other when the first cover and the second cover are in a raised state.

7. The cover apparatus according to claim 2, wherein the up-down movement mechanism has a lever that operates the first cover and the second cover, and the lever overlaps a lower end portion of the first cover and an upper end portion of the second cover with each other when the first cover and the second cover are in a lowered state, and the lever separates the first cover and the second cover from each other when the first cover and the second cover are in a raised state.

8. The cover apparatus according to claim 2, wherein the drive force source is a single motor.

9. The cover apparatus according to claim 8, wherein the up-down movement mechanism and the pivoting mechanism are connected to the single motor in a cam portion and an intermittent drive unit.

10. The cover apparatus according to claim 2, further including square U-shaped first support columns fixed to right and left side portions of a higher table portion.

11. The cover apparatus according to claim 10, further including an intermediate plate fixed to upper end portions of the first support columns.

12. The cover apparatus according to claim 11, further including second support columns fixed to right and left side portions of the intermediate plate.

13. The cover apparatus according to claim 12, further including a top plate fixed to upper end portions of the second support columns.

14. The cover apparatus according to claim 13, further including a mounting plate fixed to a right side portion of an upper surface of the top plate.

15. The cover apparatus according to claim 14, wherein the single motor includes a speed reducing mechanism that is fixed to the mounting plate.

16. The cover apparatus according to claim 15, wherein the single motor includes a rotation shaft that extends through the mounting plate.

17. A method of operating a machine tool for use with a workpiece, wherein a processing space is defined in which the workpiece is processed, and a setup space is defined in which a setup for processing of the workpiece is performed, the method comprising the steps of:

providing a first cover between the processing space and the setup space;

providing a second cover below the first cover so as to separate the processing space and the setup space from each other in cooperation with the first cover;

moving the first cover and the second cover upward and downward with an up-down movement mechanism; and pivoting the second cover with a pivoting mechanism.

18. The method according to claim 17, further including the step of generating a drive force for the updown movement mechanism and the pivoting mechanism with a drive force source.

19. The method according to claim 18, further including the steps of:

forming the drive force source via one drive portion, and connecting the up-down movement mechanism and the pivoting mechanism to the drive force source via a cam mechanism that transmits the drive force from the drive force source to the up-down movement mechanism and the pivoting mechanism at a set timing.

20. The method according to claim 19, further including the steps of:

transmitting the drive force from the drive force source to the up-down movement mechanism with a first cam portion of the cam mechanism so that the first cover and the second cover are held in a raised state, transmitting the drive force from the drive force source to the pivoting mechanism with a second cam portion of the cam mechanism when the first cover and the second cover are held in the raised state, and connecting the pivoting mechanism to a workpiece changing arm that moves the workpiece between the processing space and the setup space by pivoting below the second cover when the first cover and the second cover are raised.

21. The method according to claim 20, further including the step of:

operating the first cover and the second cover with a lever of the up-down movement mechanism, such that the lever overlaps a lower end portion of the first cover and an upper end portion of the second cover with each other when the first cover and the second cover are in a lowered state, and the lever separates the first cover and the second cover from each other when the first cover and the second cover are in the raised state.

22. The method according to claim 19, further comprising the step of:

operating the first cover and the second cover with a lever of the up-down movement mechanism, such that the lever overlaps a lower end portion of the fist cover and an upper end portion of the second cover with each other when the first cover and the second cover are in a lowered state, and the lever separates the first cover and the second cover from each other when the first cover and the second cover are in a raised state.

23. The method according to claim 18, further comprising the step of:

operating the first cover and the second cover with a lever of the up-down movement mechanism, such that the lever overlaps a lower end portion of the first cover and an upper end portion of the second cover with each other when the first cover and the second cover are in a lowered state, and the lever separates the first cover and the second cover from each other when the first cover and the second cover are in a raised state.

* * * * *